United States Patent [19]

McNally et al.

[11] Patent Number: 4,880,866

[45] Date of Patent: Nov. 14, 1989

[54] THERMOPLASTIC POLYESTER COMPOSITIONS CONTAINING CERTAIN LOW MOLECULAR WEIGHT DIEPOXIDE RESINS AND HAVING IMPROVED IMPACT BEHAVIOR

[75] Inventors: Donal McNally, Chatham; H. Leslie LaNieve, Warren; Jerome L. Costanzo, Bridgewater, all of N.J.

[73] Assignee: Hoechst Celanese, Somerville, N.J.

[21] Appl. No.: 63,731

[22] Filed: Jun. 17, 1987

Related U.S. Application Data

[63] Continuation of Ser. No. 853,282, Apr. 17, 1986, abandoned, which is a continuation-in-part of Ser. No. 788,157, Oct. 16, 1985, abandoned, which is a continuation of Ser. No. 666,684, Oct. 31, 1984, abandoned.

[51] Int. Cl.$^4$ ................ C08L 67/02; C08L 69/00
[52] U.S. Cl. .................................. 524/504; 525/64; 525/65; 525/67; 525/68
[58] Field of Search ................ 525/64, 65, 67; 524/504

[56] References Cited

U.S. PATENT DOCUMENTS

| | | | |
|---|---|---|---|
| 3,560,605 | 2/1971 | Siggel | 525/438 |
| 3,864,428 | 2/1975 | Nakamura | 525/310 |
| 3,919,353 | 11/1975 | Castelnuovo | 525/69 |
| 4,010,219 | 3/1977 | Aoyama | 524/114 |
| 4,034,013 | 7/1977 | Lane | 525/64 |
| 4,101,601 | 7/1978 | Thomas | 525/438 |
| 4,180,494 | 12/1979 | Fromuth | 525/63 |
| 4,195,134 | 3/1980 | Coleman | 525/65 |
| 4,221,694 | 9/1980 | Salee | 525/444 |
| 4,229,553 | 10/1980 | Sterzel | 525/438 |
| 4,231,922 | 11/1980 | Robeson | 525/64 |
| 4,246,378 | 1/1981 | Kometani | 525/438 |
| 4,280,949 | 7/1981 | Dieck | 524/449 |
| 4,348,500 | 9/1982 | Robeson | 525/65 |
| 4,393,153 | 7/1983 | Hepp | 523/201 |
| 4,417,026 | 11/1983 | Lindner | 525/64 |

*Primary Examiner*—Patricia Short
*Attorney, Agent, or Firm*—Burns, Doane, Swecker & Mathis

[57] ABSTRACT

Novel thermoplastic polyester compositions having improved impact behavior are produced. These compositions comprise a blend of poly ($C_2$–$C_4$ alkylene terephthalate) with certain low molecular weight diepoxide resins, a triphenyl phosphonium halide catalyst, and a multiphase composite polymer. The multiphase polymer has a first elastomeric phase polymerized from a monomer system including butadiene or butadiene/styrene and a final rigid thermoplastic phase polymerized in the presence of the elastomeric phase.

10 Claims, No Drawings

THERMOPLASTIC POLYESTER COMPOSITIONS CONTAINING CERTAIN LOW MOLECULAR WEIGHT DIEPOXIDE RESINS AND HAVING IMPROVED IMPACT BEHAVIOR

CROSS-REFERENCE TO RELATED APPLICATIONS

This application is a continuation of application Ser. No. 853,282, filed Apr. 17, 1986, now abandoned, which is a continuation-in-part of application Ser. No. 788,157, filed Oct. 16, 1985, now abandoned, which is a continuation of U.S. patent application Ser. No. 666,684, filed Oct. 31, 1984, now abandoned.

FIELD OF THE INVENTION

This invention relates to the production of thermoplastic polyester compositions.

BACKGROUND OF THE INVENTION

Poly ($C_2$–$C_4$ alkylene terephthalate) such as polyethylene terephthalate (PET) or polybutylene terephthalate (PBT) are well known resins for a number of uses including molding applications. Such resins are frequently blended with various additives to improve properties such as impact strength, resistance to warping, flame resistance, and thermal stability. U.S. Pat. Nos. 4,393,153; 4,180,494; 4,096,202; and 4,034,013 describe certain impact modifiers which have been suggested for use with polyalkylene terephthalates. U.S. Pat. Nos. 4,010,219 and 4,101,601 describe certain epoxy compounds which have been suggested for use in imparting improved tensile and melt strength properties to polybutylene terephthalate molding compounds. U.S. Pat. No. 4,195,134 describes a combination of certain impact modifiers and certain diepoxy compounds for use in polyalkylene terephalate molding compositions for improving the hydrolytic stability of such compositions.

The search has continued, however, for polyalkylene terephthalate molding compositions having even further improved impact behavior The present invention was made as a result of such a search.

SUMMARY OF THE INVENTION

It is accordingly an object of the present invention to provide improved thermoplastic polyester compositions suitable for the production of molded articles as well as a process for producing molded articles from such compositions and molded articles of such compositions. As compared with known prior art compositions, molded articles of the present invention have a combination of desirable properties including improved impact behavior without sacrifice of other desirable properties.

In accordance with a broad aspect of the present invention, thermoplastic polyester compositions are provided which comprise a blend of:

(a) at least about 20 weight percent of at least one poly ($C_2$–$C_4$ alkylene terephthalate);

(b) between about 0.1 and about 8 weight % based on poly ($C_2$–$C_4$ alkylene terephthalate) of at least one diepoxide resin having a molecular weight between about 350 and about 2100 and consisting essentially of at least one condensation product of bisphenol A or brominated bisphenol A and epihalohydrin and represented by the general formula (I):

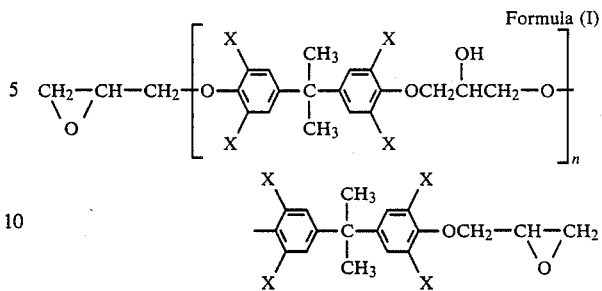

wherein X is hydrogen or bromine; and n is an average number ranging above zero and less than about 2.3;

(c) a catalytic amount of at least one catalyst selected from the group consisting of alkyl triphenyl phosphonium halides and alkenyl triphenyl phosphonium halides; and (d) between about 5 and about 30 weight % based on poly ($C_2$–$C_4$ alkylene terephthalate) of at least one butadiene-based multiphase composite polymer.

In a preferred aspect of the present invention, the thermoplastic polyester composition consists essentially of at least about 60 weight percent (wt %) polybutylene terephthalate (PBT) having an initial intrinsic viscosity between about 0.4 and about 1.3 deciliters per gram (dl/g) as determined in orthochlorophenol at 25° C., a diepoxide resin of Formula (I) having a molecular weight between about 370 and 400; butyltriphenylphosphonium bromide catalyst; and 5 to 30 percent based on polybutylene terephthalate of a multiphase composite polymer having an elastomeric first phase of butadiene or butadiene-styrene and a thermoplastic final phase of polymethylmethacrylate.

Further preferred aspects involve the use of polycarbonate and/or polyarylate resins and/or glass reinforcing fibers and mineral fillers in amounts between about 1 and about 100 weight percent based on polyalkylene terephthalate as well as preferred multiphase polymer and diepoxide resins as described below.

A central feature of the present invention is the surprising discovery that only certain low molecular weight diepoxide resins impart improved impact behavior to catalyzed blends of PBT and butadiene-based multiphase polymer. The desirable effects of improved impact behavior are not found if, for example, higher molecular weight diepoxide resins are used at the same or similar epoxide concentration.

Evidence of such a surprising discovery is set forth below in the Examples. It is demonstrated that use of the butadiene-based multiphase polymer latex, certain low molecular weight epoxy resins and catalyst additives, in accordance with the invention, results in improved PBT impact behavior compared to the use of acrylic-based multiphase polymer latax and/or higher molecular weight diepoxide resins. Such results are unexpected.

Other objects, aspects and advantages of the present invention will become apparent to one skilled in the art in view of the following:

DESCRIPTION OF THE PREFERRED EMBODIMENTS

Polyalkylene terephthalates suitable for use in the invention include for instance polyethylene terephthalate, polypropylene terephthalate, and polybutylene terephthalate. Polybutylene terephthalate (PBT) is especially suitable and in a preferred embodiment of the invention comprises at least about 60 weight percent of the thermoplastic polyester composition. The polyalkylene terephthalate used may be a single polyalkylene terephthalate or a blend of suitable polyalkylene terephthalates. As mentioned the composition of the invention includes at least about 20 weight percent poly ($C_2$–$C_4$ alkylene terephthalate). An especially preferred poly ($C_2$–$C_4$ alkylene terephthalate) is polybutylene terephthalate having an intrinsic viscosity between about 0.4 and about 1.3 dl/g.

The diepoxide resin of Formula (I) above is present in compositions of the present invention in amounts between about 0.1 and about 8, preferably about one and about 3.5, and most preferably 1.5 to 2.0 weight percent based on poly ($C_2$–$C_4$ alkylene terephthalate).

Suitable diepoxy compounds which may be used in the practice of this invention include polycondensates of Formula (I) of epihalohydrin such as epichlorohydrin with diphenylolpropane (so called bisphenol "A"), or brominated bisphenol A such as tetrabromodiphenylolpropane, in any convenient ratio so that the resulting resins will have terminal epoxy groups and average molecular weights between about 350 and about 2,100, preferably between about 360 and about 1,000, and most preferably between 370 and 400. Illustrative examples by standard trade designations include the commercially available epoxy resins Epi-Rez 509, Epi-Rez 510, Epi-Rez 5163, and Epi-Rez 5183.

The catalyst employed in the present invention may be selected from the group consisting of alkyl triphenyl phosphonium halide and alkenyl triphenyl phosphonium halide. The alkyl groups may contain from one to ten carbon atoms, the alkenyl groups may contain from two to six carbon atoms, and the halide anion is selected from the group consisting of chloride and bromide.

Alkyl triphenyl phosphonium bromides and alkenyl triphenyl phosphonium bromides are preferred catalysts. Allyl triphenyl phosphonium bromide and n-butyl triphenyl phosphonium bromide are particularly preferred.

The use of these compounds in catalytic amounts is advantageous in that the polymers produced in the process of the present invention are both less brittle and less intensely colored than those produced using the same reactants and reaction conditions but using other catalysts such as amine catalysts.

The catalyst employed in the present invention may be used in catalytic amounts, i.e., generally from about 0.01 to about 0.1, and preferably from about 0.02 to about 0.06% by weight based upon the weight of the polyalkylene terephthalate present.

The catalyst and diepoxide may be present in a mole ratio of diepoxide to catalyst of generally from about 10 to 1 to about 100 to 1, and preferably from about 20 to 1 to about 50 to 1.

As noted above, the thermoplastic polyester compositions of the present invention contain at least one butadiene-based multiphase composite polymer. The multiphase composite polymer, sometimes referred to as core/shell elastomer or impact modifier, preferably has an elastomeric first phase or core of polybutadiene or polybutadiene/styrene and a thermoplastic final phase or shell of polymethylmethacrylate. It may also have an intermediate phase of styrene.

The most preferred multiphase composite polymers are methacrylated butadiene-styrene copolymer compositions marketed by Rohm and Haas under the trade designations KM-653 and KM-680.

For further descriptions and examples of various butadiene-based multiphase polymers suitable for use in the present invention, reference may had to the aforementioned U.S. Pat. Nos. 4,034,013; 4,180,494; and 4,393,153, the disclosures of which are incorporated herein by reference.

Compositions and products of the present invention may also contain about one to about 200, preferably about 60 to 120 weight percent based on polyalkylene terephthalate of aromatic polycarbonate or polyarylates such as bisphenol-A-isophthalate-terephthalate-polyester. The effect of incorporating such polycarbonate and polyarylate is to develop impact behavior with lesser amounts of composite polymer. For further descriptions and examples of such polycarbonates and polyarylates, reference may be had to U.S. Pat. Nos. 4,180,494 and 4,221,694, respectively, which are incorporated herein by reference.

Compositions and products of the present invention may also contain up to about 25 weight percent, more typically up to 10 percent, based on polyalkylene terephthalate of suitable flame retardant additives, such as decabromodiphenyl ether and antimony oxide, and may contain relatively minor amounts of other materials which do not unduly effect the desired characteristics of finished products. Such additional materials may, depending upon the particular compositions employed and products desired include for instance, colorants or lubricants. Where present such additional materials other than polycarbonate, polyarylate, flame retardants, fibers or filler, normally comprise not more than about 10 weight percent of the total molding composition or finished product.

Compositions and products of the present invention may also include reinforcing fiber or inert filler of conventional types and amounts. In a preferred embodiment between about one and about 100 weight percent based on polyalkylene terephthalate of glass reinforcing fibers is present. Inert filler material where used is normally present in amounts between about one and about 100 weight percent based on polyalkylene terephthalate and may include such materials as glass spheres, clay, silica, silicates, oxides, etc.

In preparing compositions of the present invention the various ingredients may be prepared by conventional methods and blended in any suitable manner such as by dry blending or melt blending, blending in extruders, heated rolls, or other types of mixers. Conventional master batching techniques may also be used. Suitable manufacture and blending techniques are well known in the art and need not be described in detail here.

Compositions according to the invention are especially useful in imparting improved impact behavior to PBT of relatively low initial or starting intrinsic viscosity, especially where the viscosity of the PBT is below 1.0 dl/g such as in the range of about 0.5–1.0 dl/g. This makes the present invention especially significant with respect to such PBT of relatively low initial intrinsic viscosity since, as is well known, PBT of higher intrinsic viscosity is generally more expensive to manufacture. Thus by use of the present invention it is frequently possible to employ for a given end use PBT compositions utilizing PBT of significantly lower initial intrinsic viscosity than would normally be considered acceptable in terms of impact behavior.

The following examples are intended to illustrate the invention without limiting the scope thereof. In the examples all quantities are given in terms of weight percent based on total compositions unless otherwise stated.

In order to evaluate impact behavior of the various compositions tested, samples of the compositions in question were injection molded to produce standard ASTM test specimens. Specimens were then tested for notched Izod impact strength in accordance with ASTM procedure D-256 (except not under controlled humidity conditions which should not materially affect the results).

Compositions tested as reported herein were prepared from several different PBT compositions as indicated in the examples. The compositions were compounded on a 2.5 inch Egan extruder using the following conditions: temperature 260° C., pressure 500–2000 psi, and screw RPM 75–150. In each case the pelletized extrudate was then molded on a reciprocating screw injection molding machine to provide test specimens.

In the examples the term "epoxy" designates diepoxide resins marketed by Celanese Specialty Operations as their epoxy resins Epi-Rez 510, Epirez 522C, etc. and the term "elastomer" designates multiphase composite polymers or impact modifiers marketed by Rohm & Haas as their Acryloids KM 653 and KM 680.

EXAMPLES 1-2

For these examples a number of compositions were prepared utilizing PBT having an intrinsic viscosity of 1.0 dl/g, 0.035 percent n-butyltriphenylphosphonium bromide, and containing additional components as indicated in Table I below. These samples were tested for notched Izod impact strength as described above. The results of these tests are also shown in Table I.

TABLE I

NOTCHED IZOD IMPACT, FT.-LB./IN.

EXAMPLE 1

| | % ELASTOMER (KM 653) | % EPOXY (EPIREZ 510) | % EPOXY (EPIREZ 522C) | NOTCHED IZOD |
|---|---|---|---|---|
| Control | 15 | — | — | 1.49 |
| Run 1 | 15 | 1.5 | — | 11.80 |
| Run 2 | 15 | 1.5 | — | 16.40 |
| Comparative | 15 | — | 4.7[b] | N.M.[a] |

Example 2

| | % ELASTOMER (KM 680) | % EPOXY (EPIREZ 510) | % EPOXY (EPIREZ 522C) | NOTCHED IZOD |
|---|---|---|---|---|
| Control | 15 | — | — | 1.82 |
| Run 1 | 15 | 1.5 | — | 3.89 |
| Comparative | 15 | — | 4.7 | 1.35 |

[a]Not measured, bars out of the mold were too brittle.
[b]Weight percent required to provide some epoxide functionality as 1.5% EPIREZ-510.

EXAMPLES 3-10

Example I was repeated using varying amounts of Acryloid KM 653, and yielded high notched Izod values. A shown in Table II below, high room temperature impact was found with KM 653 down to 12.5%, while at 17.5%, a notched Izod of 5.43 ft-lb/in. was obtained at −20° C.

TABLE II

NOTCHED IZOD, FT-LB/IN.

| Example | % Elastomer (KM 653) | R.T. | 0° C. | −20° C. | −29° C. |
|---|---|---|---|---|---|
| 3 | 12.5 | 16.3 | 11.8[a]/ | 1.82 | — |

TABLE II-continued

NOTCHED IZOD, FT-LB/IN.

| Example | % Elastomer (KM 653) | R.T. | 0° C. | −20° C. | −29° C. |
|---|---|---|---|---|---|
| 4 | 15.0 | 16.4 | 4.5[b] 11.9[a]/ 3.7[b] | 2.16 | — |
| 5 | 17.5 | 18.4 | 15.2 | 5.43 | 1.57 |
| 6 | 20.0 | 17.2 | 16.9 | 4.90 | 2.63 |
| 7 | 25.0 | 17.6 | 18.3 | 2.91 | 2.75 |

[a]partial tear failure
[b]full break

At the 15% level of KM 653, increasing the epoxy resin level from 1.25% to 1.75% caused an increase in impact strength at 0° C. and −20° C. as shown in Table III below.

TABLE III

NOTCHED IZOD IMPACT, FT-LB/IN.

| | % Epoxy Resin | | Ft-lb/in. | |
| Example | (Epi-Rez 510) | R.T. | 0° C. | −20° C. |
|---|---|---|---|---|
| 8 | 1.25 | 16.3 | 5.5[a]/3.3[b] | 1.30 |
| 9 | 1.50 | 16.4 | 11.9[a]/3.7[b] | 1.82 |
| 10 | 1.75 | 16.3 | 12.3[a]/4.5[b] | 2.41 |

[a]partial tear failure
[b]full break

EXAMPLES 11 and 12

To contrast further the improved impact behavior of the compositions of the present invention, runs 15 and 30 of Coleman U.S. Pat. No. 4,193,134 were substantially duplicated. (Comparative Runs A and C in TABLE IV below). For yet further contrast, in Comparative Runs B and D runs A and C were duplicated except that 2% ethyltriphenylphosphonium bromide catalyst was dissolved in the epoxy resin. Examples 11 and 12 of the present invention were run under essentially the same processing conditions. In all cases, significantly higher impact values were achieved in the compositions of the present invention.

More particularly, compositions and impact properties for all runs are given in TABLE IV below. As indicated above, processing conditions were essentially the same for all runs. The compositions were compounded on the 2.5 inch Egan single screw extruder and then injection molded to provide the standard ASTM test specimens. Before extrusion and again before molding, the compositions were dried for 3 hours at about 110° C. The Acryloid KM330 elastomer used as shown in TABLE IV below is reported by its manufacturer (Rohm and Haas Co.) to be the commercial version of and having the same behavior as the 7709-XP elastomer or impact modifier used in runs 15 and 30 of the Coleman U.S. Pat. No. 4,193,134. The Epi-Rez 80517 epoxy resin used as shown in TABLE IV below is the same base diepoxy resin as Epi-Rez 510 except that 2% ethyl-triphenylphosphonium bromide is dissolved in it.

TABLE IV

| Sample | COMPOSITION, % | | | | | | NOTCHED IMPACT ft-lb/in. |
|---|---|---|---|---|---|---|---|
| | PBT 1.0 IV | PBT .8 IV | Acryloid KM 330 | Acryloid KM 653 | Epi 510 | Epi 80517 | |
| Example 11 | | 68.5 | | 30 | | 1.5 | 3.1 |
| Comparative Run A | | 68.5 | 30 | | 1.5 | | 1.3 |
| Comparative Run B | | 68.5 | 30 | | | 1.5 | 1.1 |
| Example 12 | 73.5 | | | 25 | | 1.5 | 10.5P |
| Comparative Run C | 73.5 | | 25 | | 1.5 | | 3.2 |
| Comparative Run D | 73.5 | | 25 | | | 1.5 | 4.2 |
| Comparative Run E | 73.5 | | | 25 | 1.5 | | 9.3P |

As may be seen from TABLE IV above, Example 11 of the present invention has a notched Izod impact strength value of 3.1 ft-lb/in. versus Comparative Run A (Coleman run 15) of 1.3 ft-lb/in. Similarly, Example 12 of the present invention has a notched Izod impact strength value of 10.5 ft-lb/in. versus Comparative Run C (Coleman run 30) of 3.2 ft-lb/in. The impact strength values for Examples 11 and 12 were also significantly higher when contrasted with Comparative Runs B and D/E, respectively.

The above examples show the unexpected advantage to be had by using the butadiene-based multiphase polymer latex and certain epoxy resins and catalyst additives in accordance with the invention in terms of improving the impact behavior of PBT molding compositions.

While the invention has been described above with respect to certain embodiments thereof, it will be understood by those skilled in the art that various changes and modifications may be made without departing from the spirit and scope of the invention.

What is claimed is:

1. Thermoplastic polyester composition having improved impact strength comprising a blend of:
   (a) at least about 60 weight percent polybutylene terepthalate having an intrinsic viscosity between about 0.4 and about 1.3 dl/g as determined in orthochlorophenol at 25° C.
   (b) between about 0.1 and about 8 weight % based on poly (C2-C4 alkylene terepthalate) of a diepoxide resin having a molecular weight between about 350 and about 2,100 and consisting essentially of at least one condensation product of bisphenol A or brominated bisphenol A and epihalohydrin and represented by the general formula (I):

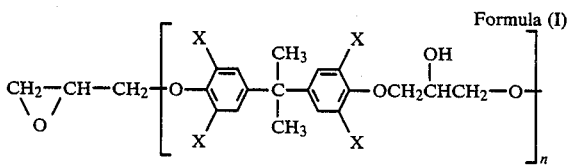

Formula (I)

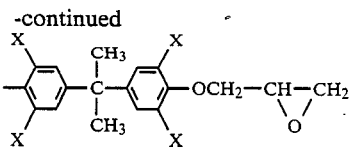

wherein X is bromine or hydrogen and n is an average number above zero and less than about 2.3;
   (c) a catalytic amount of at least one catalyst selected from the group consisting of alkyl triphenyl phosphonium halides and alkenyl triphenyl phosphonium halides; and
   (d) between about 5 and about 30 weight % based on poly (C2-C4 alkylene terephthalate) of a butadiene-based multiphase composite polymer having an elastomeric core of a polybutadiene or polybutadiene/styrene and a thermoplastic shell of polymethylmethacrylate.

2. A composition according to claim 1 further containing between about 1 and about 100 weight percent based on polyalkylene terephthalate of glass reinforcing fibers.

3. A composition according to claim 1 further containing from about one to 200 weight percent based on polyalkylene terephthalate of aromatic polycarbonate.

4. A composition according to claim 1 further containing from about one to 200 weight percent based on polyalkylene terephthalate of polyarylate.

5. A composition according to claim 1 further containing between about one and about 100 weight percent based on polyalkylene terephthalate of inert filler.

6. A composition according to claim 1 further containing up to twenty-five weight percent based on polyalkylene terephthalate of flame retardant additive.

7. A thermoplastic polyester composition having improved impact strength consisting essentially of a blend of:
   (a) at least about 60 weight percent polybutylene terephthalate having an intrinsic viscosity between about 0.5-1.0 dl/g as determined in orthochlorophenol at 25° C.;
   (b) between 1.5 and 2.0 weight % based on polybutylene terepthalate of a diepoxide resin having a molecular weight between 370 and 400 and consisting essentially of at least one condensation product of bisphenol A and epichlorohydrin and represented by the general formula (I):

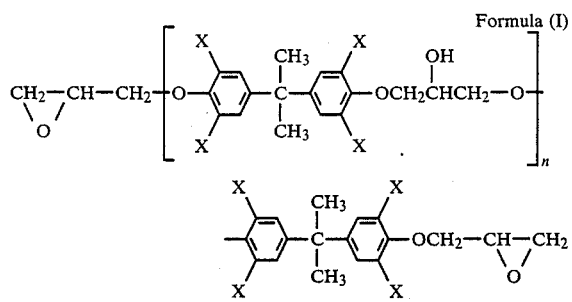

wherein n is an average number above zero and less than about 2.3;

(c) a catalytic amount of at least one catalyst selected from the group consisting of allyl triphenyl phos- phonium bromide and alkenyl triphenyl phosphonium bromide; and (d) between about 5 and about 30 weight % based on polybutylene terephthalate of a butadiene-based multi-phase composite polymer having an elastomeric core of polybutadiene or polybutadiene/styrene and a thermoplastic shell of polymethylmethacrylate.

8. A composition according to claim 7 further containing between about 5 and about 100 weight percent based on polybutylene terephthalate of glass reinforcing fibers.

9. A composition according to claim 7 further containing from about one to 200 weight percent based on polybutylene terephthalate of aromatic polycarbonate.

10. A composition according to claim 7 further containing from about one to 200 weight percent based on polybutylene terephthalate of polyarylate.

* * * * *